Patented Aug. 29, 1950

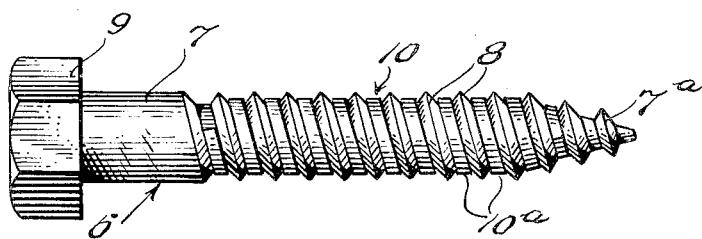
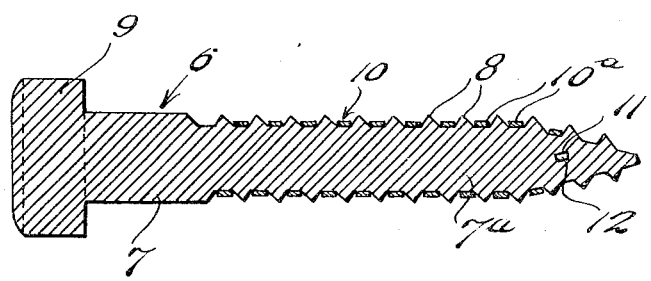
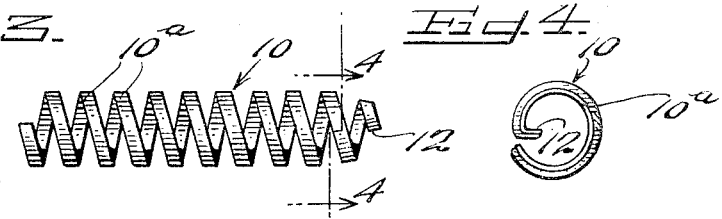
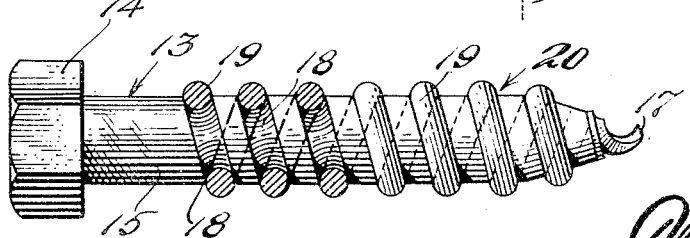

2,520,232

UNITED STATES PATENT OFFICE 2,520,232

SCREW

Bohdan Bereza, Thomaston, Conn.

Application November 7, 1945, Serial No. 627,157

1 Claim. (Cl. 85—41)

This invention relates broadly to headed driven fastenings, particularly screws, and has more specific reference to an improved so-called wood screw which is highly adaptable for use in conjunction with miscellaneous wooden trim, frames and the like.

More specifically, the invention is comprehended in two modifications in which the screw proper, that is the head and shank are metal, as usual, and the threads are of special form and adaptability. In one form, the threads proper are spaced and a spiral metal spring is associated therewith. In the other form of the invention, the shank is spirally grooved and a spiralling metal spring has its convolutions seated in the grooves, said spring thus forming and providing the desired threads.

In carrying out the specific principles of the invention, I have evolved and produced improved screw constructions, each of unusual simplicity, the threads being such as to yieldably adapt themselves to the task, whereby to minimize friction during the insertion step and to provide expansible friction to guard against accidental removal once the screw is lodged home. Thus, a screw constructed in accordance with my idea feeds itself nicely and readily into the work and when once anchored, virtually "locks" itself in place and stays put.

Other objects, features and advantages will become more readily apparent from the following description and the accompanying illustrative drawings.

In the drawing, wherein like numerals are employed to designate like parts throughout the same:

Figure 1 is an elevational view of a wood screw with the specially constructed and applied metal spiralling feeder and retainer spring.

Figure 2 is a longitudinal sectional view through the form of the screw illustrated in Figure 1.

Figure 3 is a detail view of said spiralling spring per se.

Figure 4 is a section on the line 4—4 of Figure 3.

Figure 5 is a view, partly in section and partly in elevation, showing a modified type of wood screw.

Referring now to the drawings and first to Figures 1 to 4 inclusive, it will be seen that the screw proper is denoted by the numeral 6. It is made of customary metal and regularly shaped and includes a cylindrical shank portion 7 with a pointed stem 7a having spiral threads 8 of conventional V-shaped cross sectional form. At the right-hand end is a suitable driving and tool accommodation head 9. The attachment, that is, the metal feeder-retainer is denoted as a unit by the numeral 10. As shown in Figure 3, this is a simple spiralling metal band with convolutions preferably flat in cross sectional form. When in place these convolutions lie in the spiralling grooves between the threads 8, as shown. At the pointed end the stem is provided with a transverse bore or hole 11 and the laterally directed terminal 12 is passed through and anchored in said hole for securing the attachment operatively in place.

It will thus be seen that the screw 6, which is substantially conventional is simply provided with the metal feeder attachment 10 with one end 12 anchored in the hole 11 and the convolutions 10a seated in the grooves between the threads 8. These convolutions provide the desired degree of resiliency and produce the alternate anti-friction and elastic friction retaining results desired. That is to say, the convolutions wind and coil snugly and tightly around the shank when the screw is being fed and turned "home," thus "easing" said screw into its hole. However, retrograde rotation causes the convolutions to automatically unwind, whereupon they set up friction against the wall of said hole and "lock" the screw in.

Referring now to the modification shown in Figure 5, the screw is denoted by the numeral 13 and comprises a head 14 on the shank 15, said shank being tapered at its outer tapered end and provided with a feeder element or point 17 for initial penetration purposes. The shank is provided with spiralling grooves 18, these to accommodate the coils or convolutions 19 of the spring or unit 20, said latter unit, in this instance, constituting the threads for the screw.

In both forms of the invention, the shank of the screw is provided with a metal attachment unit, the latter comprising spiralling convolutions or coils. In the form shown in Figure 1, the coils nest themselves between the main threads and supplement the action of the threads. Therefore, the attachment 10 is referred to as a two-way feeder and retainer to coact with the threads. In Figure 5, the attachment comprises spiralling convolutions or coils of metal and these preferably cylindrical in cross sectional form and fit in the grooves 18 and project beyond the surface of the shank to function as the threads instead of supplemental elements coacting with rigid threads as in Figure 1. However, there are obvious generic characteristics in both types of screws in that the screws proper are of solid metal and the spiralling metal attachments are separately applied, each having the desired features of resiliency to promote the feeding and retaining characteristics wanted.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

A lag screw and retainer therefor comprising, in combination, a headed shank, said shank having spiralling screw threads and intervening spiralling grooves, and a spiralling spring attachment embodying convolutions corresponding to and seated in said grooves, said convolutions, being flat in cross-section and of a cross-section less than the depths of said grooves whereby the crests of said screw threads lie in planes outwardly of the outer surfaces of said convolutions, and the outermost convolution being laterally directed and securely anchored to the corresponding outer end of said shank.

BOHDAN BEREZA.

REFERENCES CITED

The following references are of record in the file of this patent:

UNITED STATES PATENTS

| Number | Name | Date |
|---|---|---|
| 906,691 | Chenoweth | Dec. 15, 1908 |
| 1,011,392 | Thiollier | Dec. 12, 1911 |
| 1,199,624 | Smith, Jr. | Sept 26, 1916 |
| 1,820,644 | Bach | Aug. 25, 1931 |
| 2,150,876 | Caminez | Mar. 14, 1939 |

FOREIGN PATENTS

| Number | Country | Date |
|---|---|---|
| 21,852 | Great Britain | Oct. 26, 1905 |
| 273,780 | Great Britain | June 20, 1927 |
| 393,675 | Great Britain | June 15, 1933 |
| 739,598 | France | Jan. 13, 1933 |